Patented Oct. 19, 1954

2,692,267

UNITED STATES PATENT OFFICE 2,692,267

PHTHALIMIDE DERIVATIVES OF 2,2'-DI-AMINO-4,4'-BITHIAZOLE

John B. Campbell, Bellevue, Del., assignor to E. I. du Pont de Nemours and Company, Wilmington, Del., a corporation of Delaware No Drawing. Application November 4, 1952, Serial No. 318,733

6 Claims. (Cl. 260—306.8)

This invention relates to novel organic coloring matters. It is an object of this invention to produce novel organic compounds which are substantive to cellulose, and which are adapted for use as dyestuffs for cellulosic fiber, to give dyeings of pleasing shade, good tinctorial strength and satisfactory fastness to light and to crocking.

In U. S. Patent No. 2,537,352 are described compounds which are formed by condensing thiophthalimide, iminophthalimidine or ortho-cyano-benzamide with various aryl amines or aryl hydrazines which possess an additional amino or hydrazino group or have a pendant ring or a condensed ring attached to the aromatic nucleus. All the products thus obtained are water-insoluble, and the principal utility suggested for them in the patent is as pigments for paper, nylon, cellulose acetate and polyvinyl chloride. It was also suggested there that the compounds be rendered water-soluble by sulfonation, and that in this form they would be useful as dyestuffs for wool.

Now according to this invention, novel compounds of high tinctorial qualities and strong affinity for cotton from an aqueous bath are produced by condensing thiophthalimide, iminophthalimidine, o-cyano-benzamide, or halogen, methyl, methoxy or nitro derivatives of these, with 2,2'-diamino-4,4'-bithiazole. The latter is a compound having the formula

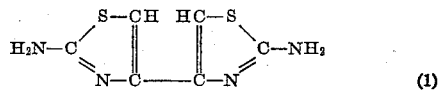

(1)

and may be prepared according to the process given in Helvetica chimica acta, vol. 31, p. 2065 (1948).

In the condensation, 2 molecules of ammonia are split off, and 2 radicals of the iminophthalimidine compound take their place, producing in the simplest case a compound most probably having the following structure:

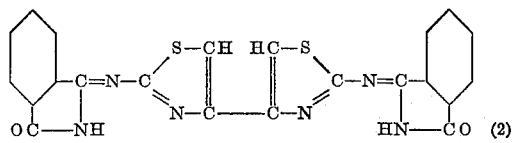

(2)

The two hydrogens attached to nitrogen are of a weakly acidic nature, and may be replaced by alkali-metals or quaternary ammonia cations to yield the corresponding salts. The acidic form is water-insoluble whereas the salts are readily soluble in water which is alkaline. Acidification of the solution, however, reprecipitates the free acidic form.

Although the alkali-metal salts are highly soluble in water, they are not readily obtainable by direct treatment of the compound with aqueous alkali, presumably because of some special physical condition of the crystals. Solution, however, may be readily achieved by treating the compound in an alcoholic liquid (or other water-miscible, non-acidic, organic solvent) with an alkali-metal hydroxide, or a strong quaternary organic base, or both. As instances of suitable solvents may be mentioned methyl, ethyl, isopropyl or butyl alcohol, dimethyl-formamide, glycol - monoethyl ether, diethylene - glycol-monoethyl ether, pyrrole, pyridine, piperidine and triethanolamine. As instance of suitable quaternary organic bases, may be mentioned choline, tetramethyl - ammonium hydroxide, benzyl - trimethyl - ammonium hydroxide, and other quaternary ammonium bases. Although the strong organic base will also succeed by itself in achieving dissolution of my novel compounds in the alcoholic solvent, the added alkali-metal hydroxide minimizes the quantity of organic base required.

The resulting preliminary solution may now be diluted with water even until the concentration of the coloring compound is less than 0.5% without precipitating the color. The solution thus obtained is stable, as long as it is kept strongly alkaline. Acidification, however, even merely to the extent of carbonic acid (from atmospheric $CO_2$) will promptly precipitate the original color.

The aqueous solution of color hereinabove obtained may be applied to cellulosic fiber directly at room temperature, or at slightly elevated temperature (say 50° C.–80° C.). The cellulosic fiber may be then merely rinsed and dried in air, or it may be washed in a slightly acid bath to develop the color and fix it firmly within the fiber.

It is remarkable, that even though many of the compounds of the mentioned patent may be put into solution by essentially the same procedure, I have not found one, among the numerous types indicted in the patent, whose dye bath has any appreciable affinity for cotton.

Synthesis of my novel compounds may be achieved essentially as in the mentioned patent, that is by heating together 2,2'-diamino-4,4'-bithiazole with iminophthalimidine or a neutral, nuclear substitution derivative thereof (e. g., chloro, bromo, methyl, methoxy or nitro) in a convenient common solvent, such as glycol, until evolution of ammonia ceases. The reaction mass is then cooled, filtered and washed with a suitable alcohol.

In lieu of glycol, any other alcohol-soluble or water-soluble, neutral or acidic solvent for the two initial materials may be employed, for instance, ethyl alcohol, acetic acid or mixtures of the two; but solvents boiling above 150° C., e. g. glycol-monoethyl ether or diethylene-glycol monoethyl or monobutyl ether are preferred. The heating may be done at any desirable temperature up to the reflux temperature of the solvent, but should preferably be over 100° C. The two principal reactants are for economic reasons employed in essentially stoichiometric proportions (that is, 2 moles of the phthalimide compound to 1 of the bithiazole), but an excess of either compound does no harm, inasmuch as it is removed in the filtrate at the end of the reaction.

In lieu of iminophthalimidine or a substitution derivative thereof, thiophthalimide or ortho-cyano-benzamide or the corresponding nuclear substitution derivatives of these may be employed. Of course, in the case of thiophthalimide, the reaction splits out $H_2S$ instead of $NH_3$, but the reaction product is the same as when iminophthalimidine or o-cyano-benzamide is employed.

The required initial iminophthalimidines are generally prepared by reacting the correspondingly substituted phthalic anhydrides or phthalimides with urea in the presence of ammonium molybdate or ammonium vanadate as catalyst. Derivatives from 4-nitro-, 3-nitro-, and 3,4-dichloro-phthalimide have been obtained by this procedure in said U. S. Patent No. 2,537,352. A methoxy compound was derived by a special procedure from 4-methoxy-phthalimide in Example 5 of the same patent.

Without limiting my invention, the following examples are given to illustrate my preferred mode of operation. Parts mentioned are by weight.

*Example 1*

A mixture of 10 parts of 2,2'-diamino-4,4'-bithiazole, 30 parts of crude iminophthalimidine (obtained by reacting phthalic anhydride and urea in the presence of ammonium molybdate in ortho dichlorobenzene at 125° C.–130° C.) and 220 parts of ethylene glycol was stirred and heated. A clear yellow-brown solution resulted and then a yellow precipitate formed as the reflux temperature (198° C.–200° C.) was reached. Ammonia gas was evolved. After three hours of refluxing the mixture was cooled to 40° C. and filtered, and the press cake was washed with ethyl alcohol. After oven drying at 90° C., there was obtained 21 parts of a yellow dye, melting above 350° C. A sample was purified by dissolving in methyl alcohol-choline solution and reprecipitating with glacial acetic acid. Its C, H, N, and S analyses agreed very closely with the formula $C_{22}H_{12}N_6S_2O_2$.

When 15 parts of purified iminophthalimidine were used in this example, instead of 30 parts of the specified crude, the same final product was obtained.

The use of 18 parts of methoxy-iminophthalimidine (Example 5, U. S. Patent No. 2,537,352) in the above procedure resulted likewise in a yellow dye of essentially similar properties.

*Example 2*

A mixture of 297 parts of 2,2'-diamino-4,4'-bithiazole, 543 parts of chloroiminophthalimidine and 5500 parts of ethylene glycol was stirred and heated. Nearly all the material was in solution as the reflux temperature was approached but a yellow precipitate quickly formed at the reflux temperature (198° C.–200° C.). Ammonia gas was evolved. After two hours of reflux, the mixture was filtered hot, and the press cake was washed with ethyl alcohol. The yellow product was dried at 90° C. Its analysis for $C_{22}H_{10}N_6S_2Cl_2O_2$ was very close.

The chloroiminophthalimidine employed above was prepared by reacting 4-chlorophthalic anhydride with urea in ortho dichlorobenzene, at 130° C.–135° C., using ammonium molybdate as catalyst. The product decomposed over the range 235° C.–260° C. and gave a satisfactory analysis for $C_8H_5N_2ClO$.

When 573 parts of the nitro-iminophthalimidines, prepared as in Examples 4 and 6 of U. S. 2,537,352, were employed in this example, yellow dyes having similar properties were obtained.

*Example 3*

A mixture of 40 parts of 2,2'-diamino-4,4'-bithiazole, 86 parts of x,x-dichloro-iminophthalimidine and 660 parts of ethylene glycol was stirred and heated to the reflux temperature (198° C.–200° C.). The evolution of ammonia gas was quite evident. After 2½ hours reflux, the mixture was filtered hot and the press cake washed with ethyl alcohol. The brown powder was dried at 90° C. to give 46 parts of product which analyzed satisfactorily for $C_{22}H_8N_6S_2Cl_4O_2$.

The x,x - dichloro - iminophthalimidine employed in this example was prepared by reacting x,x-dichlorophthalic anhydride with urea in ortho-dichlorobenzene at 130° C.–135° C. Ammonium molybdate was used as the catalyst. The product decomposed over the range 245° C.–265° C. and analyzed satisfactorily for $C_8H_4N_2Cl_2O$.

*Example 4*

A mixture of 10 parts of 2,2'-diamino-4,4'-bithiazole, 15 parts of o-cyanobenzamide and 220 parts of ethylene glycol was stirred and heated. A clear solution initially formed and precipitation occurred by the time the reflux temperature (198° C.–200° C.) was reached. Ammonia gas was evolved. After two hours of reflux, the mixture was filtered hot and the press cake washed well with ethyl alcohol. After drying at 90° C., 12 parts of a yellow dye were obtained, which was identical with that obtained in Example 1.

The following additional example will illustrate the practical application of my novel compounds.

*Example 5*

Five parts of the solid color obtained in Example 1 are suspended in 100 parts of dimethyl formamide, and 20 parts of a solution of choline in methyl alcohol (of equal parts by weight) are added. Upon shaking a clear solution results. 2000 parts of water are now added.

The resulting clear dye bath may be used to dye cotton material at room temperature or higher, as desired. The dyed cotton material is then rinsed in dilute acetic acid, and then washed and dried.

If desired a concentrated alcoholic aqueous solution of sodium hydroxide may be used above in lieu of the alcoholic choline solution.

Development of the color on the fiber may also be achieved by rinsing merely in water until thoroughly free of alkali, and then drying in air.

The dyeings thus obtained are of a pleasing, yellow shade and are fast to light, non-alkaline washing and crocking.

It will be understood that the details of my invention may be varied within the skill of those engaged in this art. Thus although the substantivity of my novel compounds to cotton, from an aqueous bath, has been emphasized above as the chief merit of my novel compounds, they are nevertheless also useful in solid form as pigments and when thus used they produce drawdowns of satisfactory strength and pleasing shades.

In lieu of ethylene glycol in the examples above, one may use any of the other alcoholic solvents hereinabove indicated, especially the lower alkyl monoethers of ethylene- and diethylene-glycol.

I claim as my invention:

1. An organic compound of the general formula

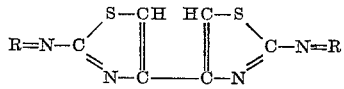

wherein R represents the bivalent C= radical of a phthalimide selected from the group consisting of phthalimide itself and its halogen, methyl, methoxy and nitro substitution derivatives.

2. A compound as in claim 1, wherein R designates the bivalent C= radical of phthalimide.

3. A compound as in claim 1, wherein R designates the bivalent C= radical of a monochlorophthalimide.

4. A compound as in claim 1, wherein R designates the bivalent C= radical of a dichloro phthalimide.

5. The process of producing an organic coloring compound which comprises reacting 2,2'-diamino-4,4'-bithiazole, in a water-miscible organic solvent, with a compound of the group consisting of iminophthalimide, thiophthalimide, o-cyanobenzamide, and the halogen, methyl, methoxy and nitro substitution derivatives of these, and recovering the solid coloring matter produced.

6. A process as in claim 5, the organic solvent being one which boils above 150° C., and the reaction being effected at substantially the reflux temperature of the reaction mass.

References Cited in the file of this patent

UNITED STATES PATENTS

| Number | Name | Date |
|---|---|---|
| 2,396,893 | Simons | Mar. 19, 1949 |
| 2,537,352 | Jones | Jan. 9, 1951 |

OTHER REFERENCES

Helv. Chim. Acta, vol. 31, pp. 2065–75 (1948).